US007529687B1

(12) United States Patent
Phan (10) Patent No.: US 7,529,687 B1
(45) Date of Patent: May 5, 2009

(54) IN-STORE CUSTOMER DISPLAY DEVICE AND METHOD

(75) Inventor: Cung Ngoc Phan, Anaheim, CA (US)

(73) Assignee: Microsoft Corporation, Redmond, WA (US)

( * ) Notice: Subject to any disclaimer, the term of this patent is extended or adjusted under 35 U.S.C. 154(b) by 551 days.

(21) Appl. No.: 09/736,543

(22) Filed: Dec. 13, 2000

(51) Int. Cl.
*G06F 17/60* (2006.01)
(52) U.S. Cl. ............................ 705/20; 705/1
(58) Field of Classification Search ................ 705/16, 705/26, 27, 20, 1
See application file for complete search history.

(56) References Cited

U.S. PATENT DOCUMENTS

| | | | | |
|---|---|---|---|---|
| 4,660,168 | A * | 4/1987 | Grant et al. | 705/8 |
| 4,825,045 | A | 4/1989 | Humble | |
| 4,833,308 | A | 5/1989 | Humble | |
| 4,843,547 | A | 6/1989 | Fuyama et al. | |
| 4,852,042 | A | 7/1989 | Zur Muhlen et al. | |
| 5,235,509 | A | 8/1993 | Mueller et al. | |
| 5,687,322 | A * | 11/1997 | Deaton et al. | 705/14 |
| 5,798,931 | A * | 8/1998 | Kaehler | 700/231 |
| 5,924,078 | A * | 7/1999 | Naftzger | 705/16 |
| 5,945,975 | A | 8/1999 | Lundrigan et al. | |
| 5,978,777 | A | 11/1999 | Garnier | |
| 6,003,015 | A | 12/1999 | Kang et al. | |
| 6,032,126 | A | 2/2000 | Kaehler | |
| 6,314,466 | B1 * | 11/2001 | Agarwal et al. | 709/231 |
| 6,401,074 | B1 * | 6/2002 | Sleeper | 705/14 |
| 6,507,352 | B1 * | 1/2003 | Cohen et al. | 345/817 |

FOREIGN PATENT DOCUMENTS

| | | |
|---|---|---|
| JP | S54-148430 | 11/1979 |
| JP | H05-108193 | 4/1993 |
| JP | H07-081186 | 3/1995 |
| JP | H08-87364 | 4/1996 |
| JP | 2000113334 A * | 4/2000 |

OTHER PUBLICATIONS

White, Ron, How Computers Work Millennium Ed. Que Corporation, Sep. 1999.*
Derfler, Frank J. et. al. How Networks Work, Millennium Ed., Que Corporation, Jan. 2000.*
Microsoft, Hardware Requirements for Multiple Display Support in Windows 98, Article ID: Q182708, Microsoft Knowledge Base (support.microsoft.com).

(Continued)

*Primary Examiner*—Pierre E Elisca
(74) *Attorney, Agent, or Firm*—Leanne Taveggia Farrell; Westman, Champlin & Kelly, P.A.

(57) ABSTRACT

A system and method for displaying information to a customer during a point-of-sale transaction by showing the information about the customer's purchase and infomercial on a single display screen. A PC-based POS system with the ability to control two display units is used. The cashier uses one of the display unit while the other is targeted to the customer. The description, price, and quantity of items scanned or entered in by cashier are shown on the customer display, along with an area programmable for advertisements, promotional offers, customer discounts, coupons, or the like. As a result, the merchant will get the additional revenues from up-sells and advertisements displayed on the customer screen, while the customer can monitor the checkout process to ensure correct pricing.

19 Claims, 7 Drawing Sheets

OTHER PUBLICATIONS

Microsoft, How to Enable Multiple Display Support Using Windows 98, Article ID: Q179602, Microsoft Knowledge Base (support. Microsoft.com).

Innovative Display Technologies, ScanVue™ Price Checker/Verifier with POP Advertising Capabilities, www.ieeinc.com.

Hypercon, Epic by Hypercon, Retail Systems Reseller, Nov. 2000, vol. 9, No. 11, p. 4; Edgell Communications, 14 Middlebury Blvd., Randolph, N.J. 07869-1111.

Julie Ritzer Ross, Touchscreens, Retail Systems Reseller, Nov. 2000, vol. 9, No. 11, p. 38; Edgell Communications, 14 Middlebury Blvd., Randolph, N.J. 07869-1111.

Deena M. Amato-Mc Coy, Putting the Web at the Point-of-Sale, Retail Tech, Oct. 2000, vol. 5, No. 10, p. 46; Bill communications, Inc., 770 Broadway, N.Y., N.Y. 10003-9595.

Microware Systems Corp., MobiNetix Chooses Microware Systems Corporation's OS-9 for Use in First Web-Enabled Transaction Computer—"Inner Strength" of OS-9 Relied upon to Power the First Java-Enabled Embedded System for Mobinetix's iPOS TC, Company Press Release, Jun. 17, 199.

Verifone, Stores, Oct. 2000, vol. 82, No. 10, p. 127, Stores Magazine 325 7th St. NW, Suite 1100, Washington, D.C. 20004.

* cited by examiner

| UPC | Description | Unit Price | Tax Rate | | |
|---|---|---|---|---|---|
| 105623 | Shirt, Yellow, 15-1/2 | 36.20 | 2.00 | ⋮ | ⋮ |
| 167623 | Milk, Lowfat, 1 Gal | 2.40 | 0.00 | ⋮ | ⋮ |
| 105602 | Hammer | 6.50 | 2.00 | ⋮ | ⋮ |
| ⋮ | ⋮ | ⋮ | ⋮ | ⋮ | ⋮ |
| ⋮ | ⋮ | ⋮ | ⋮ | ⋮ | ⋮ |

| Trigger | URL of Contents | Duration | Order |
|---|---|---|---|
| None | www.smspos.com/infomercial/default.html | 10 Seconds | 1 |
| None | C:\Infomercial\Filexyz.JPG | 5 Seconds | 2 |
| None | D:\CDROM\MovieTrailer.AVI | 60 Seconds | 3 |
| End Transaction | D:\CDROM\Welcomemessage.AVI | 3 Seconds | -- |
| ... | ... | ... | ... |
| ... | ... | ... | ... |
| ... | ... | ... | ... |
| ... | ... | ... | ... |
| ... | ... | ... | ... |

IN-STORE CUSTOMER DISPLAY DEVICE AND METHOD

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention generally relates to point-of-sale (POS) systems. More particularly, the present invention relates to displaying information to shoppers using POS systems in which a personal computer is employed as a control device for controlling a display means, a printer means, a barcode scanner means, and any other peripheral equipment.

A POS terminal is usually installed inside a retail store, particularly on a counter where sales transactions take place. Computerized POS terminals use a Stock Keeping Unit (SKU) coding system or the Universal Product Coding (UPC) system to facilitate quick item checkout and to maximize customer service. The SKU or UPC coding system uses a set of numbers to uniquely identify each inventory item or item variation. These coding systems contain a series of numbers that can be represented using vertical bars varying in width and spacing, "barcode". The code may contain manufacturer identification as well as other information, such as size, contents, etc. Selling price and item description are stored in the computer memory and can be modified when necessary by the merchant. The code may be read by machine or by optical means as binary information. The deciphered coding digits may then be indexed with a computer file that contains the actual pricing and/or information associated with each SKU or UPC. Such coding arrangements permit the automatic checkout of merchandise at one or more checkout counters by optically scanning each items' barcode which, when fed to the store's point-of-sale (POS) computer, identifies the product and automatically registers the established price for that item.

The POS terminal also contains a control unit for generating data for visual display or to be printed on a receipt in accordance with the barcode data scanned by the cashier. Recently, personal computers (PCs) have been widely used as the control unit for POS terminals. These POS terminals are commonly referred to as PC-based POS systems. PC-based POS systems are generally less expensive than proprietary POS terminals because the same hardware can be configured for various types of applications by employing the appropriate software.

But current PC-based POS systems are limited by their display means and the methods used to communicate an item's price, description, and quantity to the customer as well as promote product advertising, sale items, and other customer purchase incentives, commonly referred to as "up-sells". Current POS systems use small customer displays, commonly referred to as pole displays. Most are limited to displaying two lines of text containing about twenty alpha-numeric characters per line. LED or LCD displays capable of displaying both text and graphic images are recently available. Such displays use proprietary interfaces that must be programmed and customized for various display types, and as a result, require a computer or an embedded controller to process display commands from the point of sale terminal. These displays are usually integrated in multi-function devices such as payment terminals, electronic signature capture devices, hand-held terminals, etc. Most can present images of the complete POS transaction or advertising messages, but not both simultaneously. The present invention uses inexpensive and widely available industry standard display adapters that are common to all PC-based computer systems, and as a result can display any combination of image formats simultaneously on a single screen.

The look of any displayed message is important because it needs to keep the customer's attention in order to be effective. While the customer's purchase is being processed at the checkout counter, the messages that are shown on the pole display are simple and relatively boring and cannot be effectively used for advertising and promotion purposes. Other drawbacks with this approach are the inflexibility of the display output and the difficulty in changing the contents of the message being displayed. Most of these messages are generic for use throughout the day, for example, "Welcome to ABC Store", and cannot be easily targeted to the individual customer or the changing conditions in the store throughout the day. What is needed is a simpler and more effective system and method for displaying messages using appealing and colorful displays to communicate to the customer at the checkout stand.

Another problem that regularly results from the current pole display's inability to communicate the necessary information to the customer is when the merchant uses the POS system to scan barcodes. The problem occurs when the price associated with a particular barcode in the Price Look Up (PLU) tables contained in a POS control unit's memory, is different than the price displayed on the shelf or on the item itself. Such a problem results when a merchant changes the price of an item and only the data in the PLU tables or only the displayed price has been changed for that item. When a customer purchases such an item with this price discrepancy, the customer may actually be paying a higher price at the checkout counter than the price displayed on the shelf or the item itself. When the cashier scans an item's barcode, the POS computer calculates the item's price according to the price contained in the PLU tables located in the computer's memory, and not the low price displayed on the shelf or on the item itself that originally motivated the customer to purchase the product. A cashier operating the POS system may not be aware of all the daily price changes in a retail store and therefore may not notice the price discrepancy. Customers may not be aware that they are actually paying the higher price until they check their printed receipt, if they check the printed receipt at all. Upon discovering the higher price, the customer must return to the cashier, present the printed receipt, find the purchased item containing the barcode among all the other items purchased, have the cashier re-scan the item and check the price in the PLU tables against the price located on the shelf or on the item itself, edit the electronic record of the original purchase, adjust or refund the customer's money based on the true price, and print a new receipt with the corrected price. Whereby, the customer is greatly inconvenienced and frustrated with their shopping experience.

Another problem that commonly occurs in POS systems is when no barcode symbol is present and the cashier must manually enter a code associated with the item. The POS system must associate the manually entered code with the corresponding data in the PLU table to display the price associated with that item. An error can occur when the cashier enters the code incorrectly or when the cashier enters a code for a different but similar looking item. As a result the customer may pay for the similar item, possibly at a higher price, rather than the actual item selected.

Therefore as a result of these errors, caused by the customer's inability to monitor the scanning and pricing of the purchased items, customers feel cheated and merchants appear as deceptive, incompetent, and totally lacking in customer service which results in lost sales and failed businesses. Therefore customers and merchants need a POS system in which the customer can monitor the prices associated with their items in real-time at the checkout counter and alert the cashier to any errors so that any adjustments in the price may be made immediately and with minimum inconvenience to the customer.

PC-based POS systems running the Windows operating system can easily control multiple displays. This multiple display feature was included in the Microsoft Windows operating system to allow the computer user to increase the size of the "desktop" of the operating system to cause the computer to span the "desktop" area over two smaller monitors instead of having to purchase one large, expensive, and bulky monitor. In effect each screen when using this capability represents one half of the "desktop" of the computer, allowing the computer operator to display large documents or files across both screens for easy viewing or comparison. Such capability was included primarily for the financial services market that includes stockbrokers and commodity traders and the graphic arts field for designers and artists.

Therefore, by implementing a dual display system and method both the merchant and the customer are benefited. The cashier works with the traditional PC display screen, while pricing and advertising information are combined together on a separate customer display screen. As a result, the merchant will get the additional revenues from up-sells and advertisements displayed on the customer screen, while the customer can monitor the checkout process to ensure correct pricing.

Accordingly, a customer display system has been developed based on a novel concept of using the built-in dual display feature in PC-based systems, which maximizes advertising exposure, customer service and satisfaction while minimizing barcode-pricing errors.

SUMMARY OF THE INVENTION

The above problems are solved in accordance with the principles of this invention by providing a machine for in-store customer display and a method for showing purchase information and advertisement on a single display screen.

The primary object of the invention is to use the second display capability of Microsoft Windows or similar operating system in a new and unique manner that allows the customer to see in real-time the prices, description, and quantity input into the POS system from the barcode scanner and PLU tables.

Another object of the invention is allowing the customer to audit/monitor the prices displayed by the POS system for the items selected against the price displayed on the shelf or the item itself.

Another object of the invention is allowing the merchant to show advertising, special offers, and cross-promotions, among other items, using multimedia content including visual and sound information displayed concurrently to the customer with the pricing and quantity information of the items purchased.

A further object of the invention is to display to the customer a graphic description, static or video, of the actual item scanned so customers may instantly compare selected items with items displayed by the POS system.

Other objects and advantages of the present invention will become apparent from the following descriptions, taken in connection with the accompanying drawings, wherein, by way of illustration and example, an embodiment of the present invention is disclosed.

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
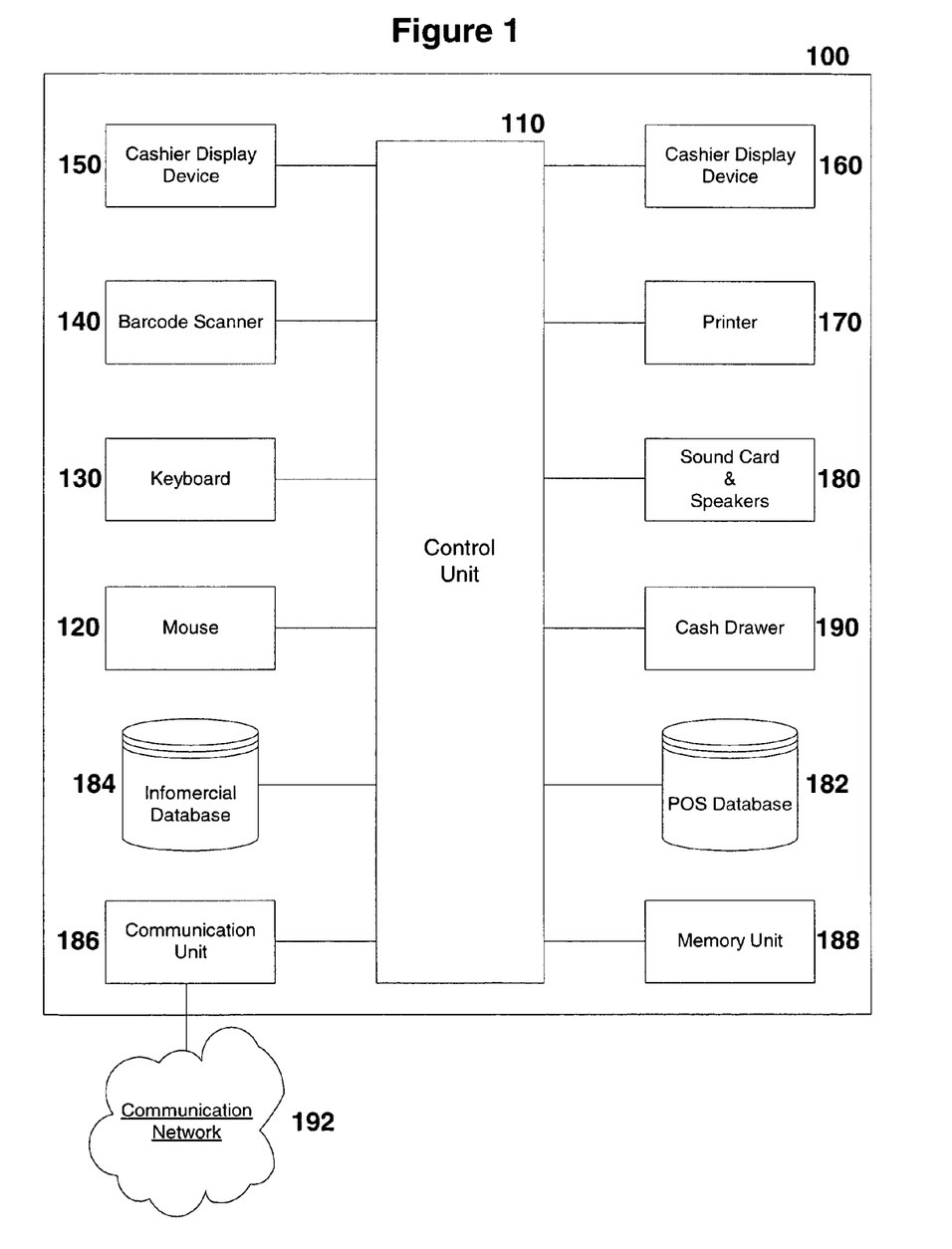
FIG. 1 is a functional diagram illustrating the various functional blocks of an in-store customer display system in accordance with the invention.

FIG. 1 shows a block diagram of an example of a system configuration of the in-store customer display system in accordance with the present invention. In FIG. 1, numeral 110 denotes a personal computer which realizes various functions of the sales transaction using POS program 330, to be described later, stored in memory unit 188 and customer display program 310, stored in memory unit 188 and to be described later, used to display text, graphics, multimedia content, and sound during the sales transaction in accordance with the present invention. Numeral 130 denotes a keyboard and numeral 120 denotes a mouse. Each is used by the cashier to enter data and select the operations required during a sales transaction. Numeral 140 denotes a barcode scanner used by the cashier to scan the UPC code of each item purchased by the customer. Alternatively, keyboard 130 can be used by the cashier to manually enter the UPC or SKU code. Numeral 150 denotes a display device facing the cashier. The POS program uses this display device to communicate with the cashier and shows the pricing information on each item as it is being scanned in. Numeral 160 denotes a customer display device capable of displaying both text and graphics. This device can be a video monitor similar to a computer monitor or LCD display and is normally faced toward the customer. Numeral 180 denotes one or more speakers that output audio information when such information is included in the message to be displayed on the customer display device 160. Numeral 170 denotes a printer used to print a sales receipt at the end of each transaction. Numeral 190 denotes a cash drawer. The in-store customer display system can exchange data with a customer display contents server, to be described later, to receive remote-feed messages through a communication network 192 such as a LAN (local area network), PSTN (public switched telephone network) or the Internet via the communication unit 186.

When an item is scanned or keyed-in, the control unit 110 looks up the pricing information in the POS database 182, displays the item price on the cashier display device 150, and formulates a data screen to be shown on the customer display device 160 using the information contained in the infomercial database 184. The POS database 182 and the infomercial database 184 are stored in a memory unit such as a disk device that is accessed by the control unit 110. The contents of the infomercial database 184 can be loaded from a storage device such as magnetic tape, CD-ROM, or downloaded via the communication unit 186 and a network 192.

Figure 2:
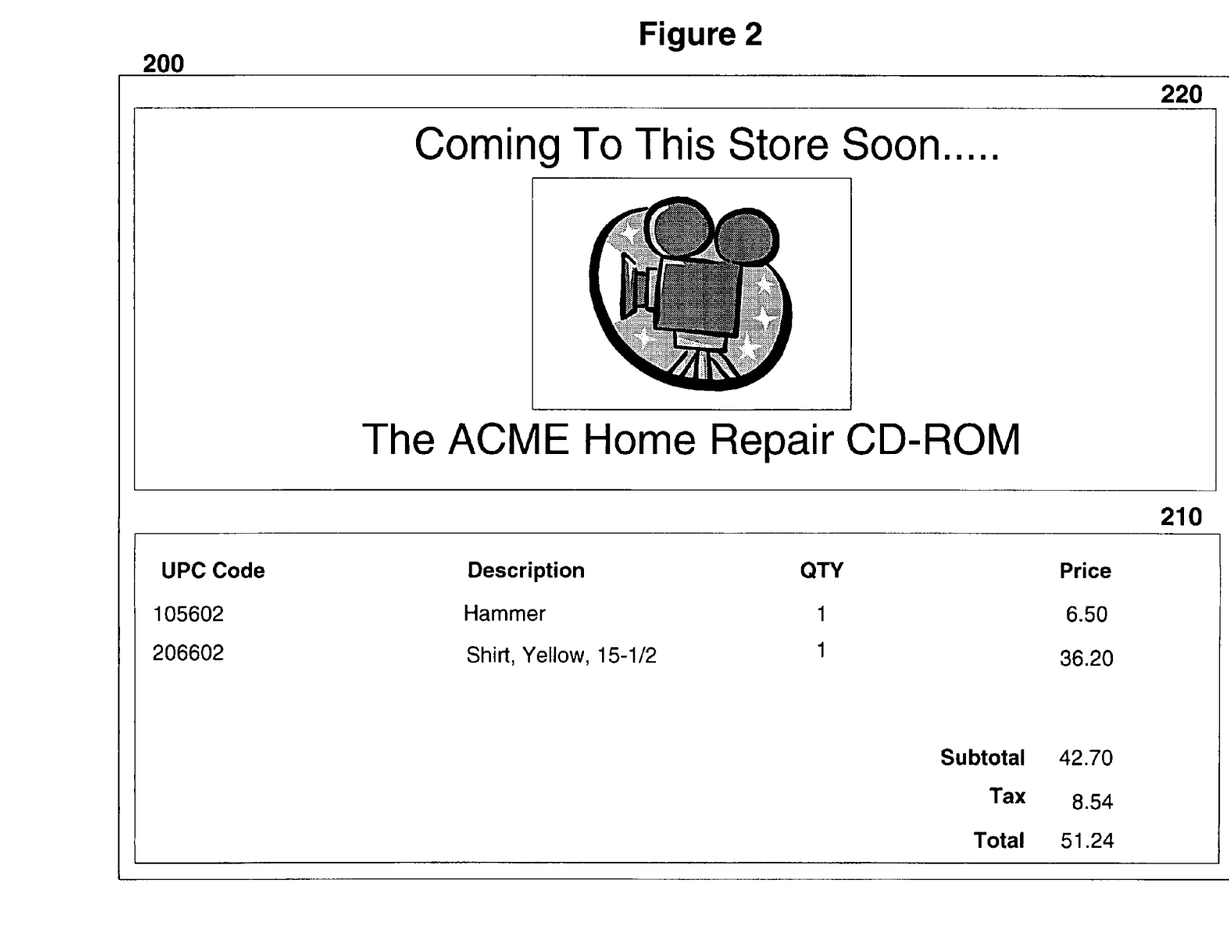
FIG. 2 shows a screen configuration of one example of a screen displayed to the customer during checkout.

FIG. 2 shows an example of a customer display screen presented on the customer display device 160 during the checkout process in accordance with the present embodiment. In FIG. 2, numeral 200 denotes the entire screen of the customer display device 160. This screen consists of two windows, the receipt window 210 and the infomercial window 220, which can be arranged horizontally as shown or vertically. In the present embodiment, each window is implemented as an HTML browser, similar to Internet Explorer or Netscape Navigator, capable of displaying text, graphics, and multi-media content. The receipt window 210 shows a description of each item scanned or keyed in by the cashier, along with pricing and quantity information used by the customer to monitor what he or she is buying. In the present embodiment, when an item is scanned or keyed-in, the item's description is expressed by displaying characters or images and the subtotal, tax, and total amount is recalculated by POS program 330 as explained later. What content is displayed in infomercial window 220 is controlled by the customer display window program 300 as explained later.

Figure 3:
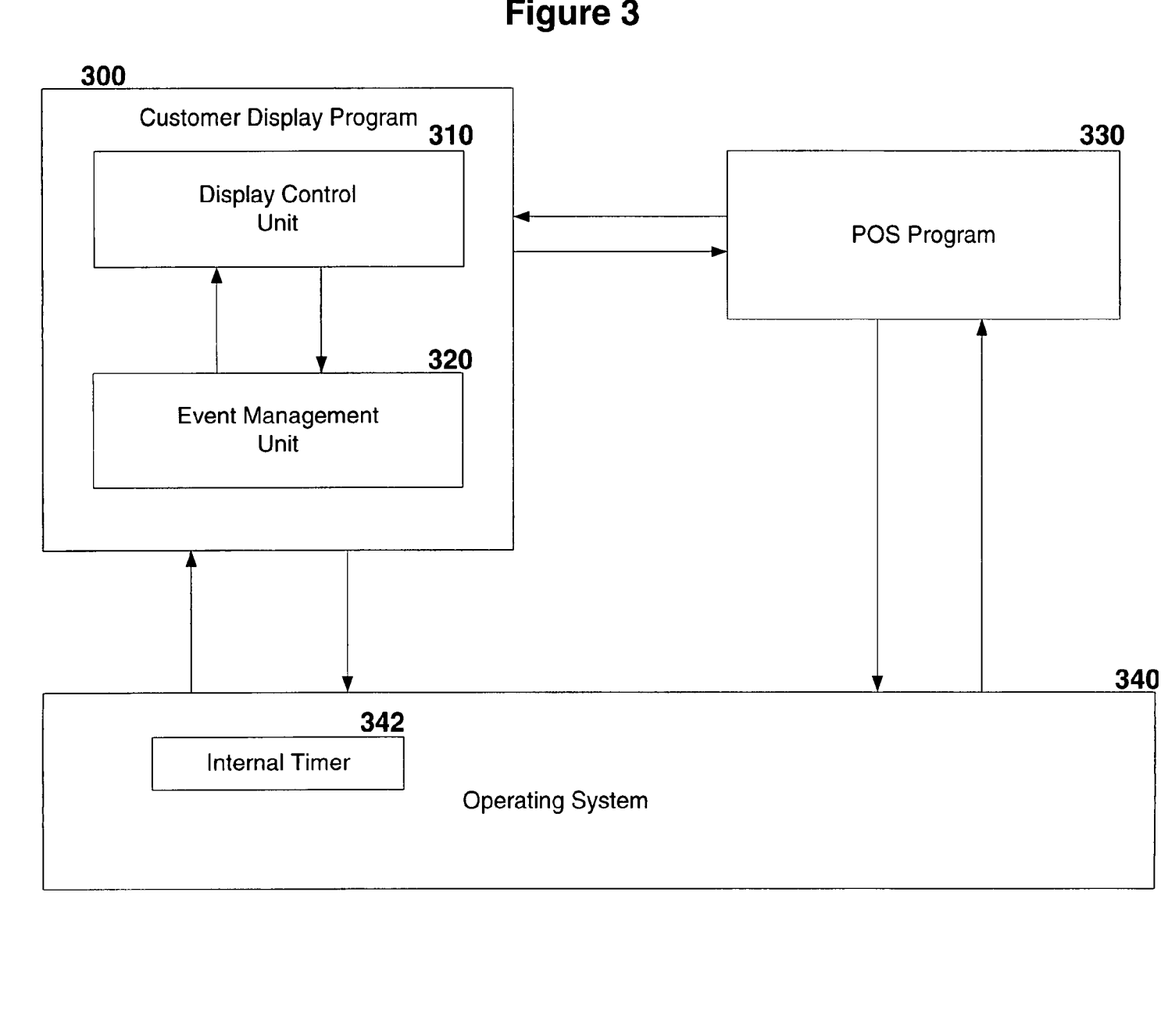
FIG. 3 shows a block diagram of a functional configuration of a customer display program.

FIG. 3 shows a functional configuration of the in-store customer display system 100 in accord with the present invention, which includes a POS program and the customer display program stored in memory unit 188. In FIG. 3, numeral 300 denotes a customer display program for providing the in-store customer display function, which comprises a display control unit numeral 310, and an event management unit numeral 320. The event management unit 320 receives and interprets the event information generated by the internal timer numeral 342 of the operating system numeral 340 and delivers the event information to the display control unit 310. The display control unit 310 receives the event information from the event management unit 320 and processes the event information to control the position and type of content displayed in the infomercial window 220.

Numeral 330 denotes a POS program that receives and interprets scanner or keyboard input event information sent from operating system 340. POS program 330 then uses the interpreted input event information to look-up the corresponding item in the POS database 182; obtains the corresponding pricing information for that item; computes the subtotal, tax, and total amount based on the pricing information; and then delivers the computed amount to the event management unit 320. The event management unit 320 receives and interprets the event information generated by the POS program 330 and signals the display control unit 310 when a new condition that requires a display update is detected. The display control unit 310 receives the event information from the event management unit 320 and processes the event information to control the position and type of content displayed in the receipt window 210.

The configurations shown in FIGS. 1, 2 and 3 are mere examples to implement the present invention and other configurations may be adopted. For example, in the present embodiment, either the infomercial window or the receipt window may be hidden, thus allowing one window to take up the entire screen. The event management unit 320 may be implemented to respond to display change events other than the internal timer 342, for example, an external message received from the communication unit 186, or events generated by the POS program 330 based in the item purchased or information in the customer's profile.

Figure 4:
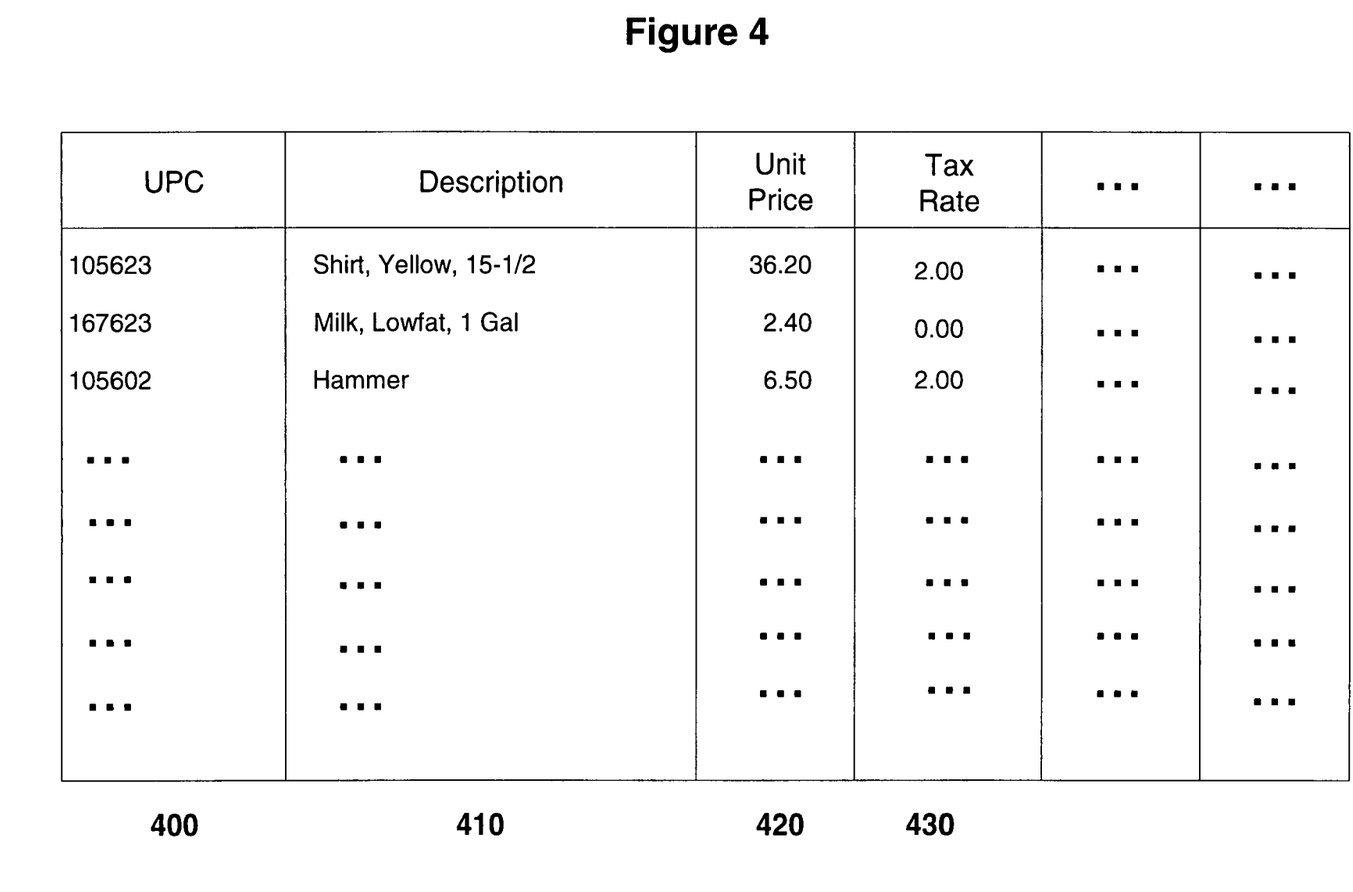
FIG. 4 shows a data structure of an example POS database.

FIG. 4 shows an example of information on the items stored in the POS database 182. In FIG. 4, numeral 400 denotes an item lookup code or barcode for identifying individual items, numeral 410 denotes a description of individual items, numeral 420 denotes an area for storing a unit price of the item, and numeral 430 denotes an area for storing the tax rate to be applied when the item is sold.

Figure 5:
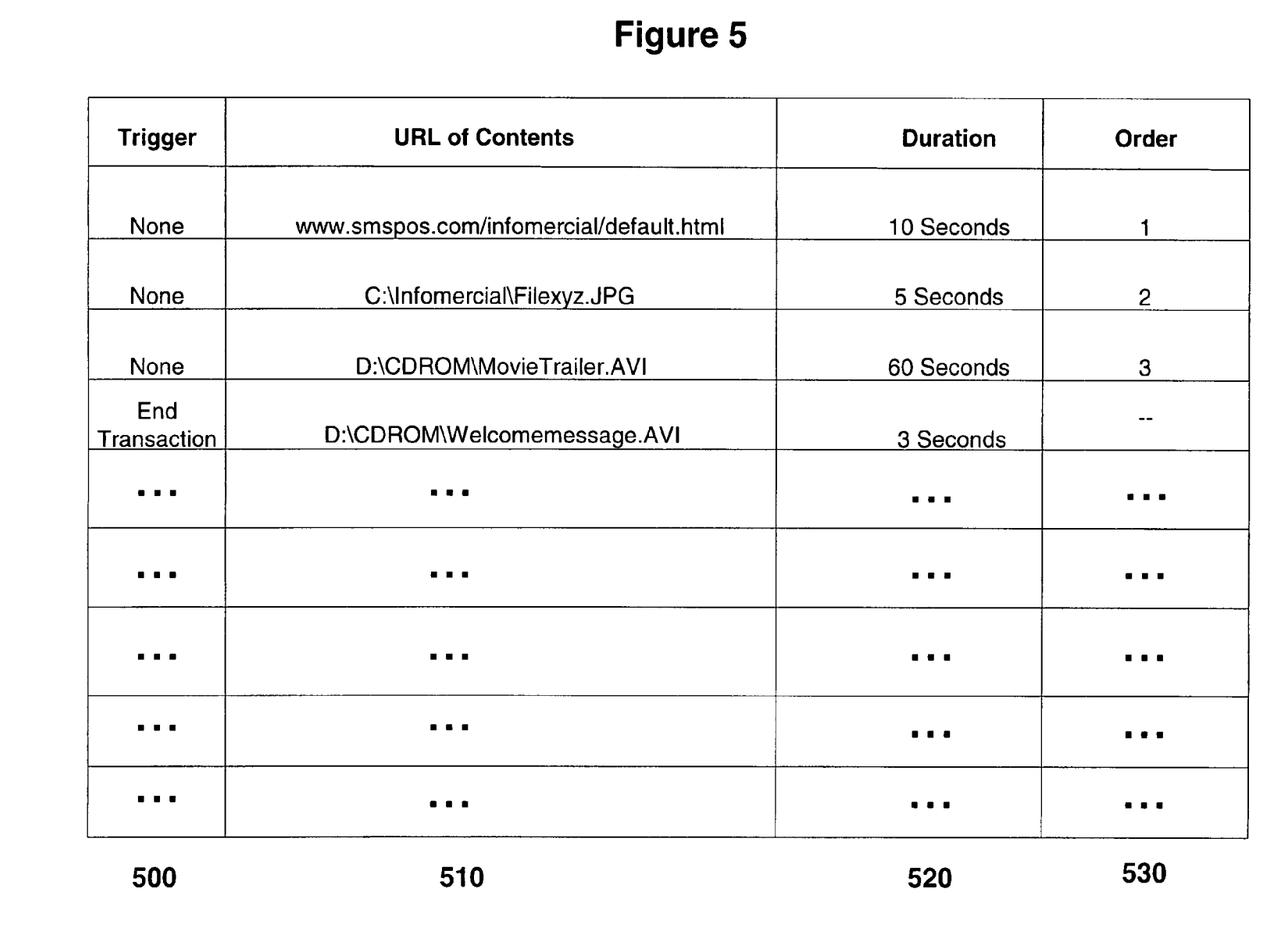
FIG. 5 shows a data structure of an example infomercial database.

FIG. 5 shows the contents of the infomercial database 184. In FIG. 5, numeral 500 denotes the type of event that will trigger a change of the contents in the infomercial window 220, numeral 510 denotes a universal resource locator (URL) address that indicates where to find the contents of the information to be displayed in infomercial window 220, numeral 520 denotes the length of time the contents will be displayed, and numeral 530 denotes the sequential order under which each infomercial content will be shown. The infomercial contents are shown in the order specified unless pre-empted by a trigger event in 500.

Figure 6:
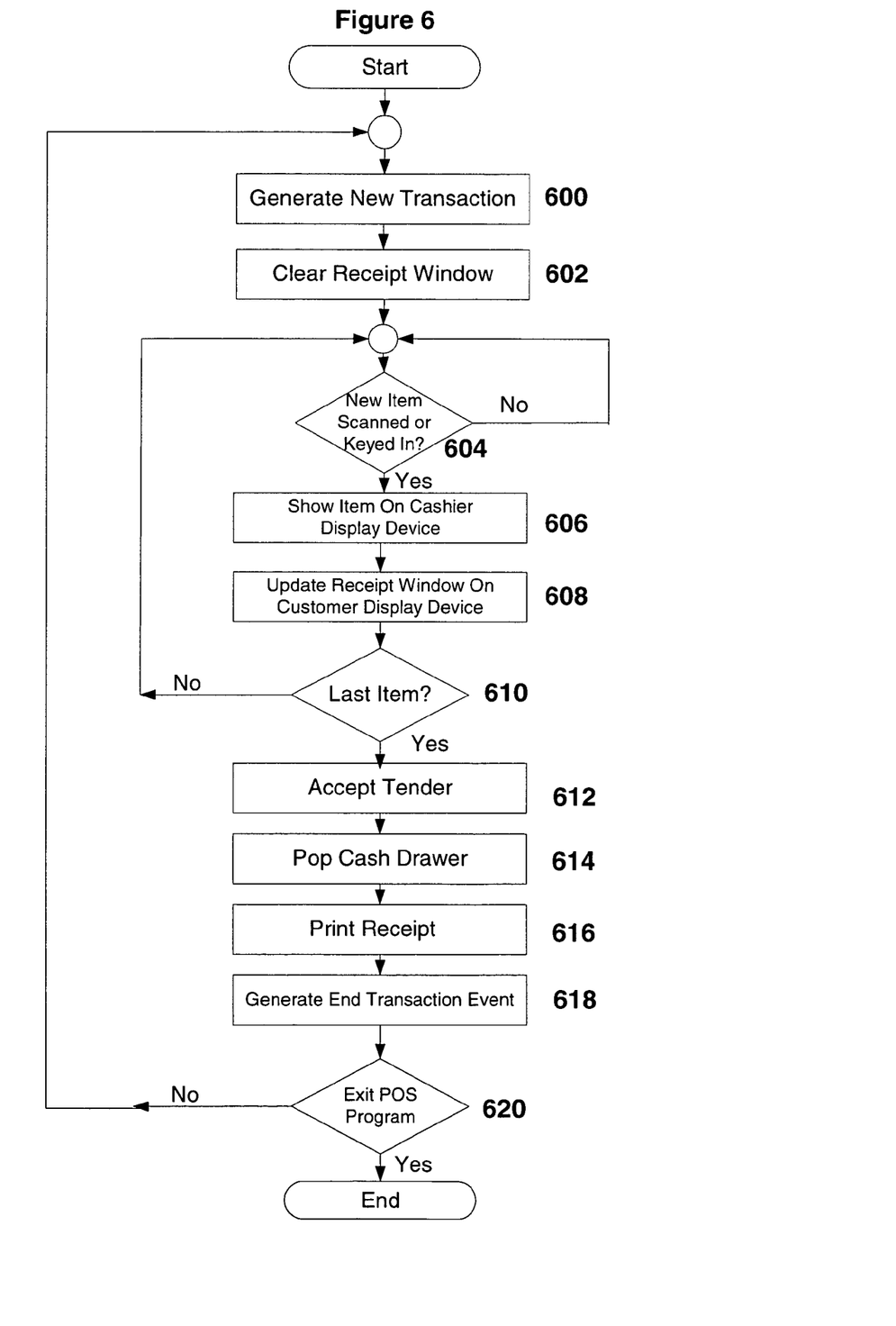
FIG. 6 shows a flow chart of a process conducted when performing a sales transaction.

FIG. 6 shows a simplified flow chart of a process conducted by the POS program 330 to perform a sales transaction and to update the receipt window 210 in accordance with the present embodiment. In conducting a sales transaction, the cashier starts a new transaction. A new transaction identification number (ID) is generated (step 600) and the receipt windows cleared (step 602). The cashier then begins to scan the barcodes or key in the item look up code. This action is continuously monitored (step 604) and when a new item is detected, the POS program searches for the item in the POS database 182 to find relevant data, performs price and tax computations, and shows the item data on the cashier display device 150 (step 606). The same information is formulated for display on the receipt window 210 (step 608). If more items are to be entered, the sequence is repeated from step 604. Otherwise, the total amount due is displayed on the cashier display device 150 and customer receipt window 210 and the cashier accepts amount paid (step 612). The cash drawer is opened (step 614) for the cashier to deposit the money or make change. A receipt is printed (step 616) and an event indicating the end of the sales transaction is generated (step 618). This event may be used to trigger a change of content in the infomercial window 220 at the end of a sales transaction.

Figure 7:
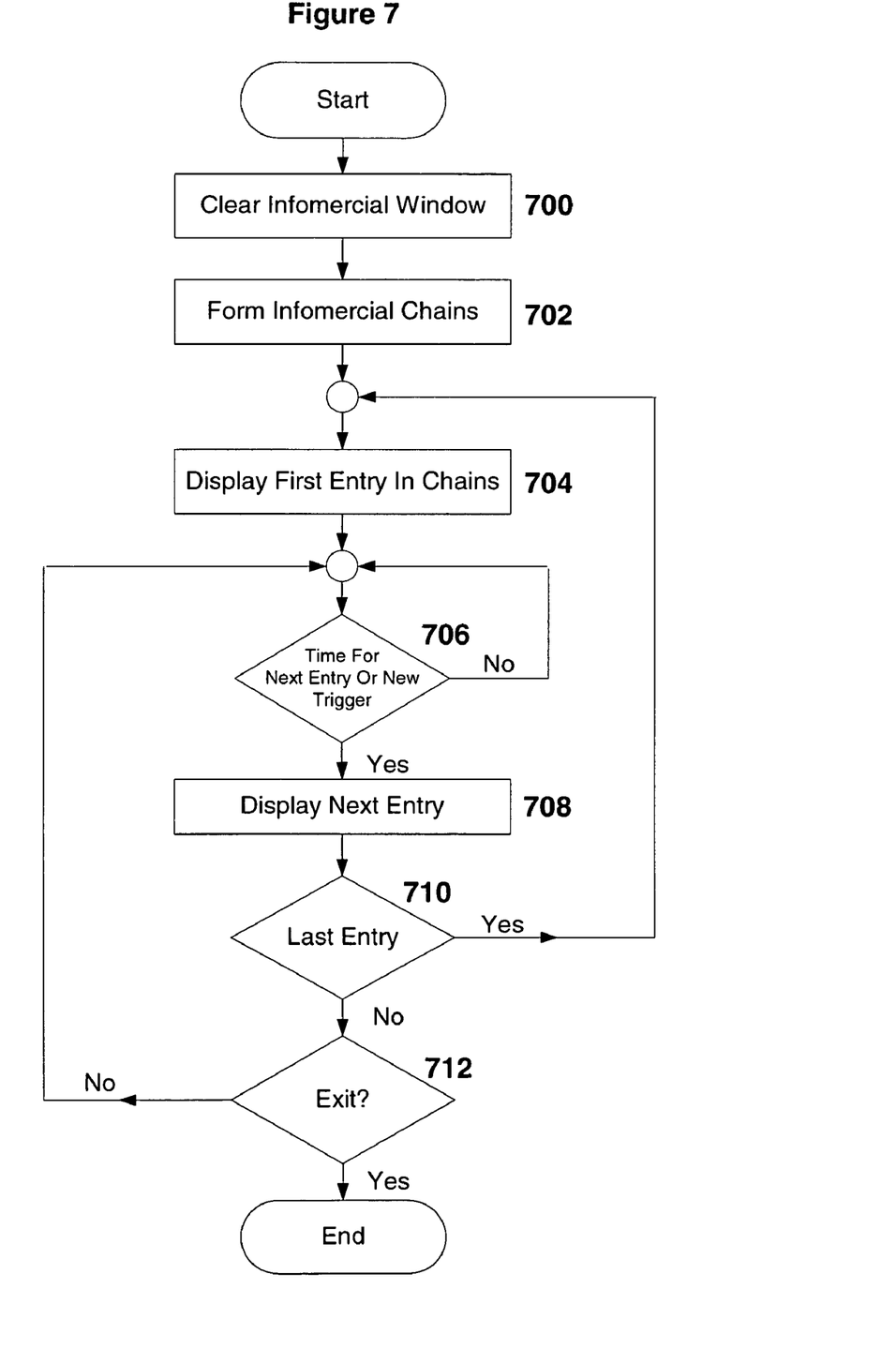
FIG. 7 shows a flow chart example of a process for displaying infomercial contents on the customer display device.

FIG. 7 shows a simplified flow chart of a process conducted by the customer display window program 300 to show the desired information to the customer in accordance with the present embodiment. The display sequence is started at the same time as the POS program 330. The infomercial window 220 is created and cleared (step 700). The software method for creating a HTML browser window, capable of displaying text, graphics, and multi-media content in a Windows operating system is well known in the art. The entries in the infomercial database 184 are read to form a chain of contents (step 702) to be displayed, based on the sequential order entries 530, the duration entries 520, and the trigger entries 500. The first entry in the chain is displayed (step 704) using the contents found in the URL address entry 510. The event management unit 320 determines from the internal timer 342 or other events generated by the POS program that it is time to display the next entry in the infomercial chain (step 706). If the current contents have been displayed for the specified duration and there is no other trigger event, the next contents in the sequence will be shown (step 708). If a trigger event is detected, the current contents will be replaced with the contents that match the trigger event (step 708). Otherwise, the current contents will be displayed until it expires. If the current contents are the last entry in the chain, the first one in the chain will be re-displayed (step 710). Upon detection of an exit or termination event from the operating system, the customer display window program will terminate (step 712).

The flowcharts shown in FIGS. 6, and 7 are mere examples to implement the minimum processing actions to achieve the objectives of this invention and other variations may be adopted. For example, additional steps may be added to allow the cashier to select a customer from a list of customers in the POS database, or to accept and process credit cards, or to add additional trigger types into the infomercial chains.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What I claim as my invention is:

1. A display system that displays information to an in-store customer during a point-of-sale transaction, the display system comprising:
    a control unit configured to operate a customer display device by accessing an infomercial database and receiving input data related to item information in a sales transaction from at least one of a plurality of input devices, the infomercial database including a list of types of trigger events and their corresponding sequence of multimedia entries to be displayed based on the type of trigger event;
    a point-of-sale program module coupled to the control unit and configured to process the input data by accessing a point-of-sale database;
    a customer display program module coupled to the control unit and the point-of-sale program module, the customer display program module configured to display the processed input data and configured to display the sequences of multimedia entries located in the infomercial database on the customer display device;
    an event management unit configured to receive and interpret the input data processed by the point-of-sale program module to notify the control unit when trigger events occur that require an update to the customer display device; and
    wherein the control unit includes an internal timer, the control unit is configured to display each multimedia entry on the customer display device for a duration of time based on the internal timer until the event management unit detects a trigger event, upon detection of the trigger event, the control unit interrupts the sequence of multimedia entries and changes the multimedia content to be displayed on the customer display device by displaying a different sequence of multimedia entries that match a type of the detected trigger event as indicated in the infomercial database.

2. The display system of claim 1, wherein the point-of-sale database comprises merchant data including price information, tax information and description information related to items for sale by a merchant.

3. The display device of claim 2, wherein the point-of-sale program module processes the input data by comparing the input data to the merchant data located in the point-of-sale database and calculating a price for each item selected by a customer for purchase.

4. The display system of claim 1, wherein at least one of the plurality of input devices comprises a barcode scanner, a keyboard and a mouse.

5. The display system of claim 1, wherein the sequence of multimedia entries are displayed on the customer display device when the point-of-sale program module begins to process the input data.

6. The display system of claim 1, wherein each multimedia entry displayed on the customer display device comprises a web page accessible by a web browser.

7. The display system of claim 1, wherein each web page displayed on the customer display device comprises one of text, graphics, photographs and video images.

8. The display system of claim 1, wherein the customer display program module comprises a display control unit, the display control unit displays the sequence of multimedia entries until the trigger event occurs.

9. The display system of claim 1, wherein the trigger event causes a corresponding trigger entry to be displayed on the customer display device.

10. The display system of claim 1, wherein the customer display device comprises a touch sensitive screen for use in allowing a customer to interact with the customer display device.

11. The display system of claim 1, wherein the multimedia entries comprise advertisement content, promotional content and coupon content.

12. A computer-implemented method of displaying information to an in-store customer during a point-of-sale transaction, the method comprising:
    receiving input data related to a sales transaction from at least one of a plurality of input devices;
    processing the input data by accessing a point-of-sale database;
    accessing an infomercial database that includes types of trigger events and their corresponding sequence of multimedia entries to be displayed upon occurrence of the type of trigger event;
    displaying the processed input data on a customer display device;
    interpreting the processed input data to determine when a trigger event occurs that requires an update to the customer display device;
    displaying a sequence of multimedia entries on the customer display device, each multimedia entry of the sequence of multimedia entries is displayed for a duration of time;
    detecting a trigger event; and
    interrupting the sequence of multimedia entries to change content on the customer display device to a different sequence of multimedia entries that match the type of trigger event.

13. The computer-implemented method of claim 12, wherein displaying the sequence of multimedia entries is initiated upon processing the input data.

14. The computer-implemented method of claim 12, wherein processing the input data comprises:

comparing the input data with data stored in the point-of-sale database; and calculating a price for at least a portion of the sales transaction based on the data stored in the point-of-sale database.

15. The computer-implemented method of claim 12 and further comprising displaying the processed input data on a cashier display device.

16. The computer-implemented method of claim 12 and further comprising printing a customer receipt at the end of the sales transaction using a printer.

17. A computer-implemented method of displaying multimedia information to an in-store customer during a point-of-sales transaction, the method comprising:

accessing sequences of multimedia entries that are stored in an infomercial database, each sequence of multimedia entries correspond with a type of trigger event;

displaying a select sequence of multimedia entries on a customer display device during the point-of-sales transaction, wherein each multimedia entry in the select sequence of multimedia entries is displayed for a duration of time;

receiving an input indicative of a trigger event while the select sequence of multimedia entries are displayed; and displaying a different sequence of multimedia entries than the select sequence of multimedia entries, the different sequence of multimedia entries match the received trigger event.

18. The computer-implemented method of claim 17, wherein the trigger event comprises an end of the point-of-sales transaction.

19. The computer-implemented method of claim 17, wherein displaying the sequence of multimedia entries begins upon initiation of the point-of-sales transaction.

\* \* \* \* \*